United States Patent Office 3,606,283
Patented Sept. 20, 1971

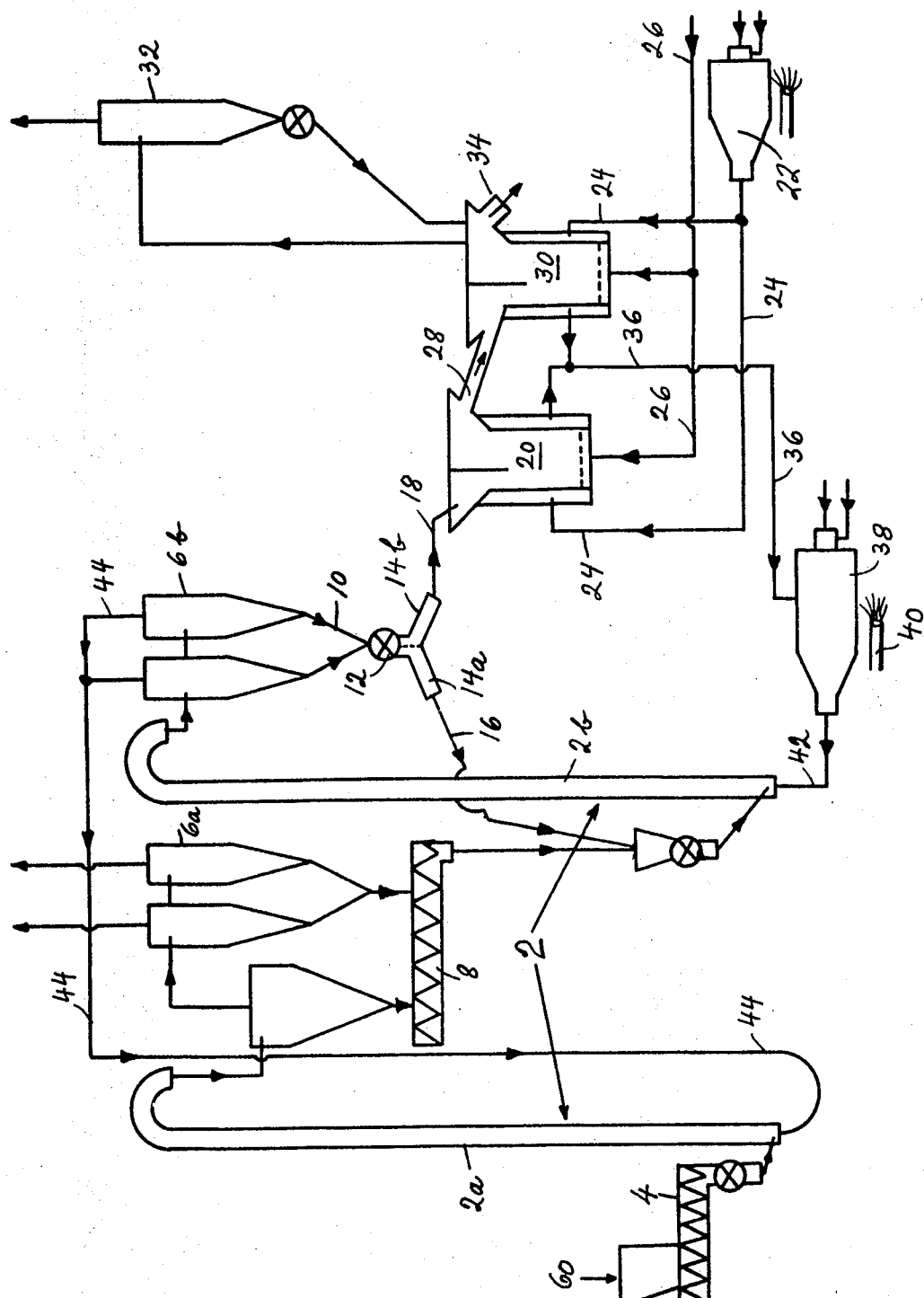

3,606,283
PROCESS FOR THE CONVERSION OF HYDRATED HALIDES INTO ANHYDROUS SALTS AND APPARATUS THEREFOR
Wilhelm Georg Weber, Pratteln, Switzerland, assignor to Buss A.G., Basel, Switzerland
Filed July 23, 1969, Ser. No. 844,042
Claims priority, application Switzerland, July 31, 1968, 11,732/68
Int. Cl. F27b 15/00
U.S. Cl. 263—21A 9 Claims

ABSTRACT OF THE DISCLOSURE

A process for the continuous conversion of hydrated halides into anhydrous salts, which comprises pre-calcining the moist hydrate in a first step by heating it with vigorous agitation to a temperature at which the total surface moisture and part of the crystal water are removed, and thereafter further heating the pre-calcined salt in stepwise operation in a gently moving layer until the temperature for complete calcination is reached. For bringing about the moving action, dry gas is introduced into the layer of pre-calcined salt while it is being further heated for complete calcination, said gas also serving for entraining the steam formed during the drying process. The invention further relates to an apparatus for carrying out the calcination.

---

The present invention relates to a process for the conversion of hydrated halides into salts free of crystal water and to an apparatus for carrying out the process of the invention.

The known processes and devices for removing water from multiple hydrates of halides are encountering considerable difficulties when it is desired to obtain the salts in a practically anhydrous form. This is due to the fact that upon conversion into simple hydrates or partial hydrates recrystallization processes will occur which entail splitting off of the halogens. Precautionary steps had therefore to be taken when carrying out the known methods, which rendered them expensive and led to high losses of heat, both these factors being considered serious shortcomings of the known methods.

The difficulties encountered in the calcination, or water removal, of hydrated halides will be more fully explained below, taking as an example a fluoride which is known to exist in different states, namely as trihydrate, monohydrate, semihydrate and in the anhydrous form. The fluoride dealt with in this illustration is $AlF_3$, this fluoride now becoming increasingly important; the disadvantages mentioned above have therefore been studied and described in numerous publications.

In the calcination of $AlF_3$-trihydrate it has been proposed to overcome the danger of hydrogen fluoride being split off by heating aluminum fluoride, formed when the trihydrate is heated, to the final temperature necessary for practically complete water removal, within a few seconds or preferably within a second or less. This requires the condition that the aluminum fluorohydrate has to be heated up very rapidly. For large-scale industrial plants this requires extremely expensive devices and, as mentioned above, heat losses are very high, which is an added expense.

In another process it was proposed to subject $AlF_3$-trihydrate by centrifuging the crystallized salt, obtaining it in superficially moist condition, drying and centrifuging once more to dryness, whereupon it is calcined in muffle furnaces without being moved and in an unmoved atmosphere. This method permits to obtain satisfactory results by heat treatment at temperatures of 600 to 700° C. during 2 hours inasmuch as 98.2% or 96.4% $AlF_3$ were obtained. However, the very marked disadvantage of this process is that only very small ovens and charges can be used since otherwise the goods would form partially fused agglomerated cakes during the calcination under the pressure of their own weight.

Finally, the calcination may be performed in an externally heated tunnel furnace. The goods are admitted to the furnace in thin layers, the furnace being initially heated to 140° C. Over 85% of the length of the furnace, the temperature is gradually increased to about 520° C., the goods being passed through this section within 34 hours. The remaining length of the furnace is passed through in 5 hours while the temperature is raised from 520 to 560° C. The yield in $AlF_3$ is 98.4%. This process, too, has the disadvantage of long dwell time of the goods in the furnace and it is not suitable for large-scale production.

Another method which was found unsuitable for the treatment of large amounts of hydrated halides is a calcination process subdivided into several stages.

Experiments carried out by the inventor have shown that certain contradictions appearing in the publications up to date concerning advantageous calcination times and results are due to the fact that certain forms of hydrated halides tend to decomposition particularly when they are kept moving for prolonged time in a zone of higher steam contents. Since during the calcination steam is continuously reproduced, it is either necessary enormously to shorten the time of passage of the goods during the critical calcination phases or to dry out the steam produced during the drying process by introducing comparatively large quantities of a dry gaseous medium.

Extremely short times of passage of the goods during the critical calcination phase cause, however, such violent movement that an undesirable comminution of the grain can occur and that dust formation becomes undesirably high. In contrast thereto, steam formed during drying can escape freely when the goods are maintained immovable in comparatively thin layers.

It is the object of the present invention to provide a process for the calcination of hydrated halides, which avoids the shortcomings of the known methods outlined above.

It is another object to provide a process which is suitable for large-scale industrial production of halides free from water, at high yields.

It is a further object of the invention to provide an apparatus which is suitable for carrying out the process of the invention.

Other objects and advantages of the invention will become apparent from the following detailed description and the accompanying drawing illustrating the same.

One of the interesting facts found was that e.g. aluminum fluorides, particularly the monohydrates and semihydrates, tend to decomposition while the beta form of the superficially moist trihydrate is fairly insensitive and can even be subjected to vigorous agitation without the occurrence of excessive decompositions or undesirable grain comminution if the drawing device is adequately designed.

It is a characteristic feature of the process for continuous conversion of hydrated halides into the anhydrous form that the moist hydrate is pre-calcined in a first stage by heating it with intense movement to a temperature at which all the water from the surface and part of the crystal water are removed, whereupon the pre-calcined goods are undergoing further stepwise heating in gently moving layers until the temperature necessary for complete dehydration is reached; the steam formed during this procedure is eliminated continuously by the dry gas which is admitted under pressure for maintaining eddy formation in the layer of the goods.

The apparatus for carrying out the process comprises as first element a rapid drier, for example at least one pipe line for pre-drying the flowing goods, which is associated with a dust separator and a line for circulation. It further comprises a two-stage heating device, each stage consisting of an indirectly heated calcining chamber, burner means for heating the chambers indirectly and means for injecting the dry gas, preferably compressed air, into the goods being heated in the chambers, so as to bring about eddy formation therein and capable of entraining and removing steam formed during the drying process.

In the sole figure of the accompanying drawings on exemplary embodiment of a device for carrying out the invention is schematically illustrated. Dehydration of $AlF_3$-trihydrate is again taken as an example.

Referring to the drawing, a drier 2 is shown for the flowing goods, including two pipes, 2a and 2b. The goods 60 to be dehydrated are admitted continuously by a feed-in screw conveyor 4. Between the outlet of the first pipe 2a and the inlet into the second pipe 2b, a dust separator in the form of a multiple cyclone 6a is arranged which empties into a screw conveyor 8. The outlet of the second pipe 2b is connected to a second multiple cyclone 6b through a line 10 leading to a two-way dividing valve 12 selectively feeding two short branch lines 14a, 14b. From line 14a a circuit line 16 leads back to the inlet of pipe 2b, and a line 18 to the inlet of a first calcining chamber 20 which is heated indirectly by gas generated in a burner 22 and arriving through a line 24.

A pipe line 26 is leading in from the bottom into chamber 20, through which air is injected for maintaining movement in chamber 20. At a certain height in the chamber an overflow 28 branches off, leading the goods to a second calcining chamber 30 which has the same design as chamber 20, receives heat from line 24, and gas for eddy formation from line 26 but is additionally connected to a cyclone 32. A discharge pipe 34 is provided for passing the dried goods to a cooler (not shown).

The hot burner gases are collected in a line 36 and passed into a mixing chamber 38 where they are, if necessary, heated up by another burner 40. From the chamber 38 a line 42 leads to the inlet of pipe 2b, from the outlet thereof over multiple cyclone 6b through a line 44 into the inlet of pipe 2a, and from the outlet of the latter over the multiple cyclone 6a into the open.

The device operates as follows: $AlF_3$-trihydrate, moist as it leaves the centrifuge, is continuously fed by screw conveyor 4 into first pipe 2a of the drier 2. The temperatures and flow velocities of pipes 2a, 2b are so regulated that the goods will reach cyclone 6b with a temperature of 200 to 300° C. There, the dust entrained by the gas is deposited and the goods, whose total water contents has decreased to about 8 to 10%, arrives at valve 12 where part of it is passed back via line 14a and by line 16 to drier 2 whereas the other part is admitted via lines 14b and 18 to the next stage.

The pre-calcined material, from which all the superficial moisture has been eliminated and which has been converted mostly from trihydrate to monohydrate, arrives with about 8 to 10% crystal water into calcining chamber 20. By injection of air through pipe line 26, the goods are maintained in movement, whereby a thorough and uniform heat transmission is obtained and the steam which is split off is continuously removed. The time of stay in chamber 20 is about 10 to 20 minutes while the temperature is adjusted to 400° C. Thus an intermediate calcination occurs. After the goods have reached the adjusted temperature, the particles of the material have lost weight and they pass through overflow 28 into the second chamber 30. There, the final calcination occurs at a temperature of 560° C. during a time of about 10 minutes. After that temperature has been reached, the goods are passed on through overflow 34 into a cooler (not shown). Small amounts of dust formed in the second and third stages are separated in cyclone 32 and carried back into chamber 30.

In a continuous operation of a device comprising three stages, a pre-calcination stage, an intermediate calcination stage, and a final calcination stage, $AlF_3$ could be obtained in a yield of more than 96%.

The device according to the invention has the marked advantage of saving energy by using the heating gases of the chambers for drying the goods in the pipes 2a, 2b. The amount of returned dust is small since the eddy formation is gentle.

EXAMPLE 1880 kgs./h. washed and centrifuged cake of $AlF_3 \cdot H_2O$ with approximately 8% surface moisture is fed continuously by the screw conveyor 4 into the first part 2a of the flash or rapid drier 2. Here the cake is heated during its passage to approximately 130° C., and most surface moisture is removed and taken up by the hot carrier gas stream entering with low moisture, after the preceding separation from the product stream of pipe 2b in the multiple cyclone 6b.

The surface-dry product is separated from the moisture-laden gas in the multiple cyclone 6a, and fed by the screw conveyor 8 into the second part 2b of the flash drier, after having been mixed and stirred; the partially dehydrated product is then fed back by the line 16 to the inlet of pipe 2b, the product having a temperature of approximately 240° C. The feedback forms in the flow divider or valve 12 which roughtly classifies the heavier particles for feedback.

It was recognized that such particles are on the one hand not sufficiently evenly dry on the average, as obtained in the rapid drying stage 2, and are also formed with agglomerates not yet completely loosened during the previous treatment. The feedback with 240° C. being admixed to the freshly entering material having a temperature of 130° C., raises the average material temperature before entry into the second pipe 2b of the flash drier where very hot and completely dry gas is used. Admixture of dry feedback facilitates fluidizing in the carrier gas stream, loosens the average spacing between the trihydrate particles, and facilitates moisture escape.

Approximately 1090 kgs./h. are then passed by the valve 12 to the indirectly heated calcining chamber 20 and is maintained in fluidized state with dried air which continuously carries away any moisture released during dehydration. Particles reach the chamber temperature of 400° C. and become lighter after an average dwell time of 10 to 20 minutes.

The particles then overflow into the second chamber 30 where the indirect heating is maintained at 560° C. particle temperature, reached after an average dwell time of 10 minutes. Fluidizing of the surface layer for overflow of fully calcined product is assisted by dust feedback from the cyclone separator 32. 100 kgs./h. of $AlF_3$ with less than 0.5% $H_2O$ continuously overflow and enter the subsequent cooler (not shown). The recovery in the form of calcined $AlF_3$ is higher than 96%.

What I claim is:

1. A process for the continuous conversion of hydrated halides into anhydrous salts, which comprises pre-calcining the moist hydrate in a first step by heating it with vigorous agitation to a temperature at which the total surface moisture and part of the crystal water are removed, and thereafter further heating the pre-calcined salt in stepwise operation in a gently moving layer until the temperature for complete calcination is reached, wherein dry gas is introduced into the layer of pre-calcined salt while it is being further heated for complete calcination, for bringing about the movement in said layer and for entraining the steam formed during the drying process.

2. The process as defined in claim 1, further comprising heating said pre-calcined salt in a first zone to about 400° C. for about 10 to 20 minutes, and in second zone to about 560° C. for about 10 minutes.

3. The process as defined in claim 2, further comprising subjecting $AlF_3$-trihydrate to said pre-calcining step at a temperature of 200 to 300° C. until the total water contents is decreased to about 8 to 10% and most of the trihydrate is converted into monohydrate, whereafter the partly dehydrated salt is heated in said first zone to about 400° C. for about 10 to 20 minutes and finally in said second zone to a temperature of about 560° C. for about 10 minutes, whereby a yield of $AlF_3$ of more than 96% is obtained.

4. The process as defined in claim 1, wherein a portion of said pre-calcined salt is branched off and returned into said pre-calcining step.

5. The process as defined in claim 1, wherein dust formed during the calcination process and entrained by the gases is deposited in separators.

6. An apparatus for carrying out the continuous conversion of hydrated halides in stages, comprising a rapid drier for pre-calcination of the halides, said drier including at least one pipe for through-flow of the goods, a dust separator in series with said drier, and a line for recycling a portion of the pre-calcined goods, and further comprising two heated calcining chambers, one for each of two calcining stages, an intermediate and a final stage, indirect heating means for said chambers, means for injecting dry gas into said chambers so as to cause the goods to be subjected to gentle movement, and for entraining steam generated during the calcination process.

7. The apparatus as defined in claim 6, wherein said separator consists of a plurality of cyclones.

8. The apparatus as defined in claim 6, wherein said heating means includes a first burner and a connecting line from said burner to said chambers.

9. The apparatus as defined in claim 8, wherein said heating means further includes a second burner for further heating gas escaping from said chambers, and for passing it on to said drier for utilization in the pre-calcination of the goods.

References Cited

UNITED STATES PATENTS

| | | | |
|---|---|---|---|
| 3,203,681 | 8/1965 | Rosa et al. | 34—57UX |
| 3,329,417 | 7/1967 | Ruble | 263—21A |
| 3,513,560 | 5/1970 | Lamare | 34—10 |

CHARLES J. MYHRE, Primary Examiner

U.S. Cl. X.R.

34—10, 57A